Aug. 19, 1969           G. H. BUSH ET AL.           3,462,741
                AUTOMATIC CONTROL OF PERIPHERAL PROCESSORS
Filed July 25, 1966                                7 Sheets-Sheet 1

INVENTORS
GRANT H. BUSH
KEITH A. DUKE

BY
ATTORNEY

United States Patent Office 3,462,741
Patented Aug. 19, 1969

3,462,741
AUTOMATIC CONTROL OF PERIPHERAL PROCESSORS
Grant H. Bush, Poughkeepsie, and Keith A. Duke, Wappingers Falls, N.Y., assignors to International Business Machines Corporation, Armonk, N.Y., a corporation of New York
Filed July 25, 1966, Ser. No. 567,480
Int. Cl. G06f 7/39, 15/06
U.S. Cl. 340—172.5                6 Claims

ABSTRACT OF THE DISCLOSURE

A peripheral processor which attaches to the input/output interface of a computer and has the ability to perform arithmetic operations in parallel with the central processing unit (CPU) of the computer. Operands called samples (multipliers) and filters (multiplicands) are transferred over the I/O interface from the CPU to the peripheral processor's storage unit by a start I/O instruction specifying a write command. After data transfer, the peripheral processor automatically forms product sums in parallel with CPU operation. At completion, the peripheral processor signals the end of the operation. The peripheral processor stores the results in a local store until the CPU recognizes the end of the operation signal. Product sums are transferred over the I/O interface from the peripheral processor's storage to the CPU in response to a start I/O instruction specifying a read command.

---

This invention relates to a data processing system including a central processor and one or more peripheral processors and more particularly to apparatus in such a data processing system to control or synchronize the operation of the peripheral processors.

Prior data processing systems have, on occasion, employed a special purpose processor as a peripheral device to perform various specific functions of a routine nature thereby relieving the central processing unit (CPU) of such tasks. However, in order for such a peripheral or slave processor to be synchronized with the main program of the data processing system, the CPU had to be employed to initiate and monitor the operations of the peripheral device. In such prior systems, the slave processor was coupled directly to the CPU which executed the necessary instructions to transfer the control words and data to the slave processor to enable it to perform its particular calculations as well as to monitor such transfer to the slave processor and also to monitor the transfer of the end product thereof back to main storage or to the CPU depending on the manner in which such results are to be employed. In prior art systems, this required that the CPU operation had to be interrupted or suspended during each time period in which there was communication between the peripheral processor and the system. When more than one peripheral processor were employed, the number of times that the CPU operation would be suspended would be proportionately greater.

Since the purpose of the peripheral processor is to take over certain tasks such as executing certain specific programs, it would be desirable if additional peripheral processors could be added to the system whenever the system is required to run additional particular programs. However, with the methods of adapting such peripheral processors or slave processors to a system as found in prior art, the CPU would have to be modified each time a new peripheral processor was added where the system is such that it is the CPU that controls and monitors the operations of the peripheral processor.

It is therefor, an object of the present invention to provide an improved data processing system including one or more peripheral processors.

It is another object of the present invention to provide an improved data processing system including peripheral processors that do not require the monitoring of operations by the central processor.

It is still another object of the present invention to provide an improved data processing system in which one or more peripheral processors may be added to the system without requiring modification of the central processor.

It is still a further object of the present invention to provide control means in a data processing system to control and monitor the operations of a peripheral processor.

In the King et al. patent application Ser. No. 357,369, filed Apr. 6, 1964 (assigned to the assignee of the present application), there is disclosed an automatic channel apparatus which disclosure is incorporated herein by reference. With this type of channel apparatus, an input/output operation is initiated when the CPU executes an instruction specifying the type of operation, the channel address and the I/O unit. Thereupon, the channel is directed to enter main storage at a designated location and obtain the channel address word which in turn provides the location in main storage of the desired channel command word. The channel command word includes an operation code field for the particular addressed unit, the data address to be accessed in main storage, and the count field to indicate the number of data units to be transferred to or from the addressed unit. The channel command word also includes a flag field consisting of a group of bits, a particular bit of which indicates whether or not chaining is to be initiated at the end of the particular operation to a new channel command word in the next adjacent location in main storage. Furthermore, one of the operations specified by the command code can be that of a transfer in channel command to another channel command word which resides in some other storage location. Thus, a series of channel commands can be executed including a branch to another set of commands.

With a peripheral control apparatus of the type described in the above referred to King et al. application, one or more peripheral processors may be attached by way of the standard interface to the peripheral control unit in such a manner that operation of the particular peripheral processor may be initiated by the execution of a single instruction by the CPU in response to which the control unit will retrieve the appropriate control word from main storage to specify the particular operations to be executed by the peripheral processor and also to control the transfer of that data to or from main storage as required for operation of the peripheral processor.

A feature then of the present invention resides in a data processing system including a storage and central processor having means to execute an instruction and a peripheral control unit coupled to the central processor and storage and including means responsive to the execution of instruction by the central processor to retrieve a peripheral control word from storage and initiate operation of a self-contained processor coupled to the control unit. Other features of the present invention include means for adapting the peripheral processor for cooperation with the control unit.

These and other objects, advantages, and features of the present invention will become more readily apparent from the following specification when taken in conjunction with the drawings wherein:

Figure 1:
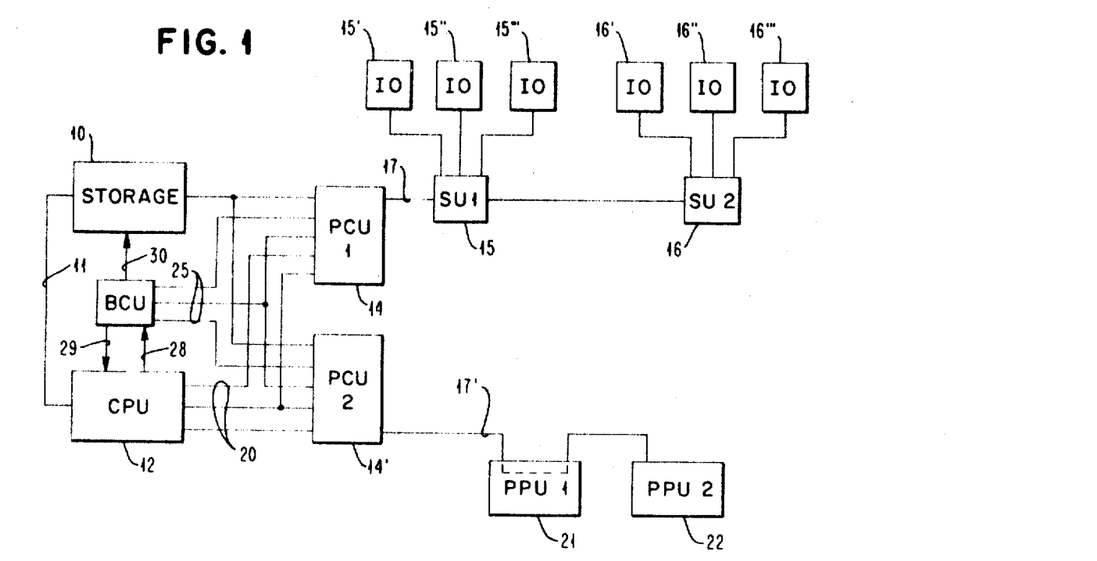
FIGURE 1 is a schematic diagram of a data processing system employing the present invention.

Referring to FIGURE 1, an information processing system of the type contemplated by the present invention includes a main core storage unit 10 connected through a suitable bus 11 to CPU 12. A plurality of switching units 15 and 16 individually govern a plurality of connected input/output devices 15′ . . . 15′′′ and 16′ . . . 16′′′. The switching units are connected through an I/O interface bus 17 that includes, among other things, a priority selection bus (not shown) since all of these switching units time share bus 17.

Each I/O interface bus connects to a peripheral control unit 14 or 14′. Each peripheral control unit 14 is connected to the CPU through a CPU interface 20 and to storage unit 10 by way of storage interface 23 which is operated as a multiplexed bus by a bus control unit 13. A bus control interface 25 interconnects the peripheral control units and the bus control unit 13. Completing the bus control unit connection is storage bus 30 and a CPU bus IN 29 and bus OUT 28.

With the present invention, peripheral processing units 21 and 22 are attached via a standard interface 17′ to peripheral control unit 14′ in a manner similar to that by which switching units 15 and 16 are attached via I/O interface 17 to peripheral control unit 14.

Before the standard interface and the peripheral control unit are described, a peripheral processor of the type contemplated by the present invention will be described. Such a self-contained processor may be designed to compute any one of a number of functions. A particular peripheral processor as disclosed herein is designed to create a plurality of sums defined by the function:

$$C_n = \sum_{y=1}^{Y} F_y \times S_{n+y-1} \quad 1 \leq n \leq N$$

which function in turn may be employed to form crosscorrelation and autocorrelation functions where the first operands ($F_y$) represent filter data and the second operands ($S_{n+y-1}$) represent sample data. Y is the number of filter operands, N is the number of sample operands and $S_{n+y-1}=0$ when $n+y-1>N$.

Figure 5A:
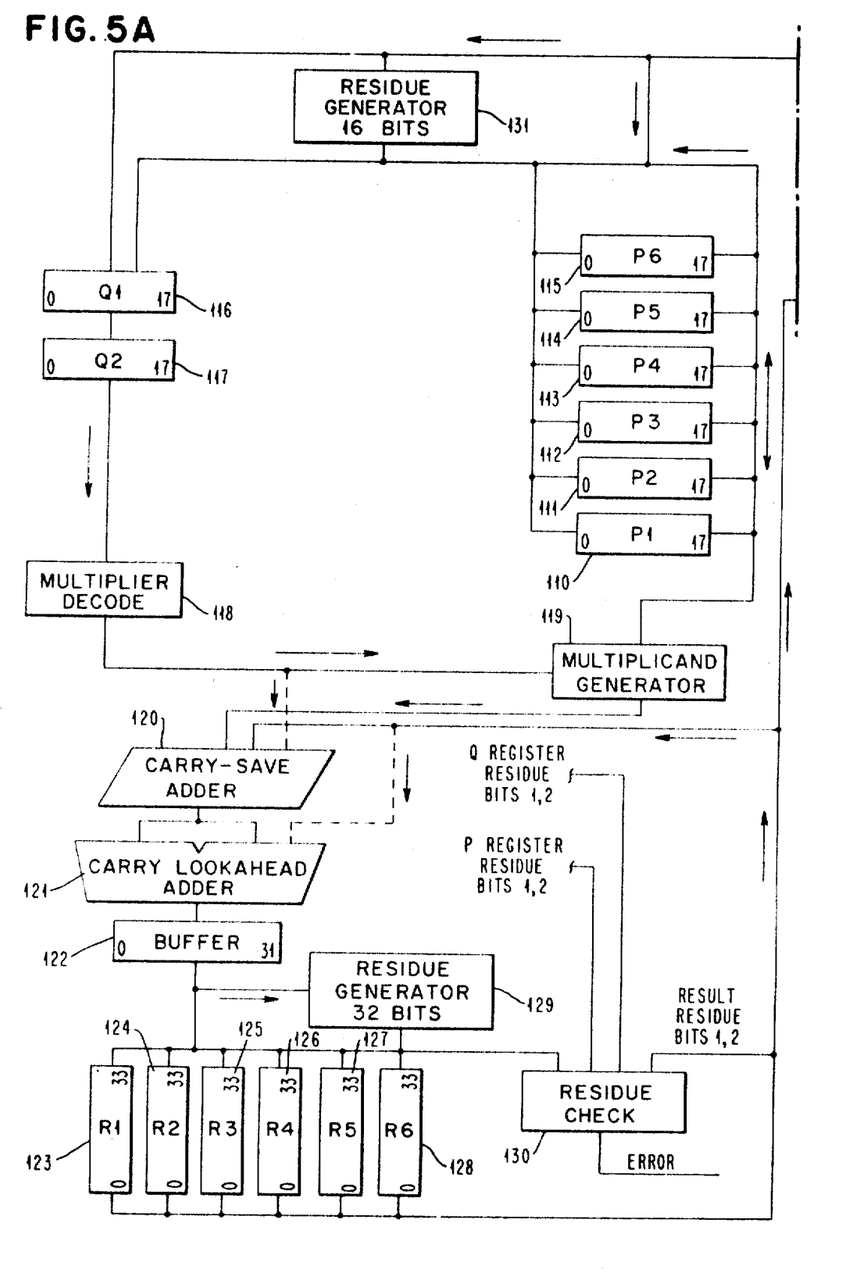
FIGURES 5a, 5b, and 5c are schematic diagrams of a peripheral processor of the type employed by the present invention.
Figure 5B:
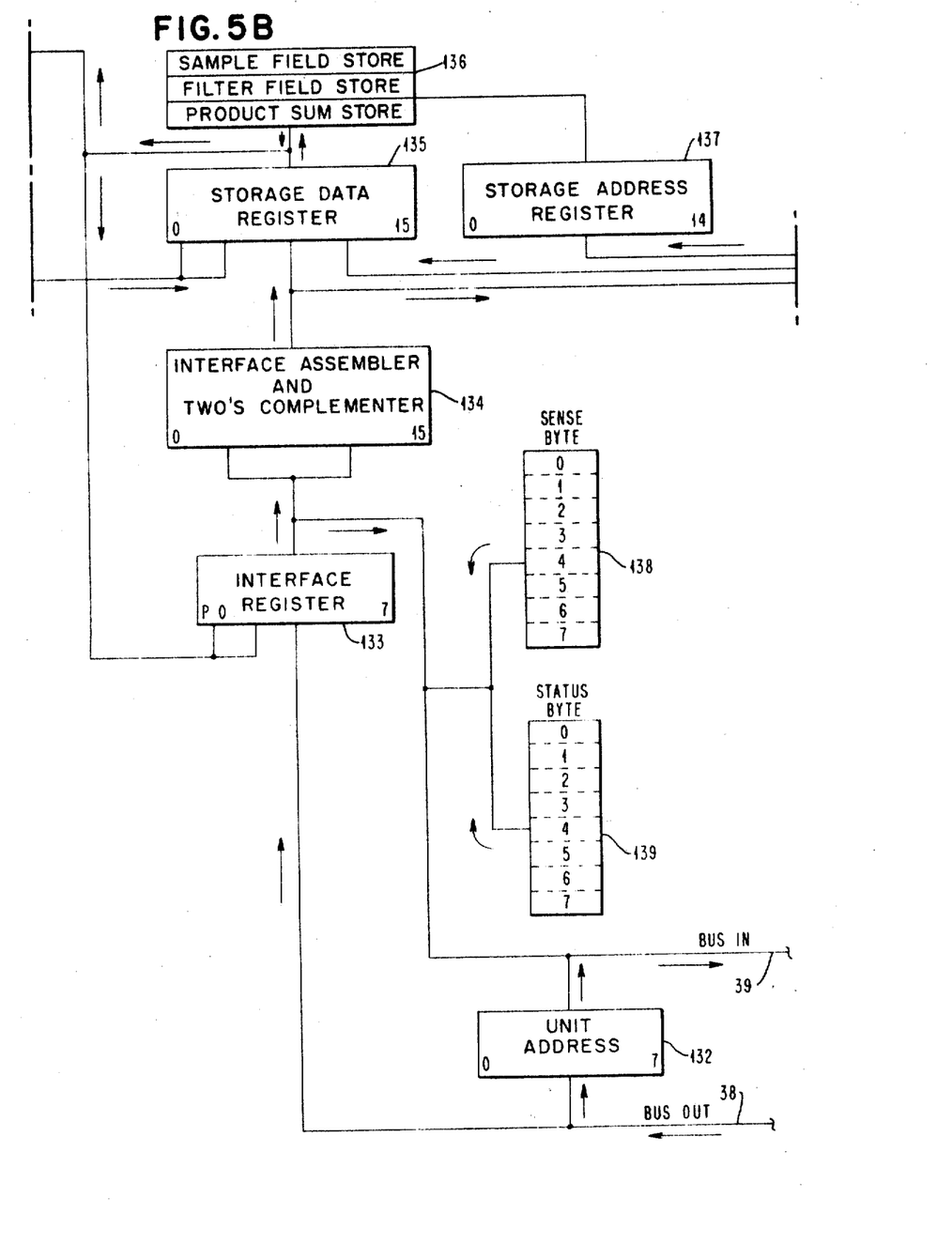
Figure 5C:
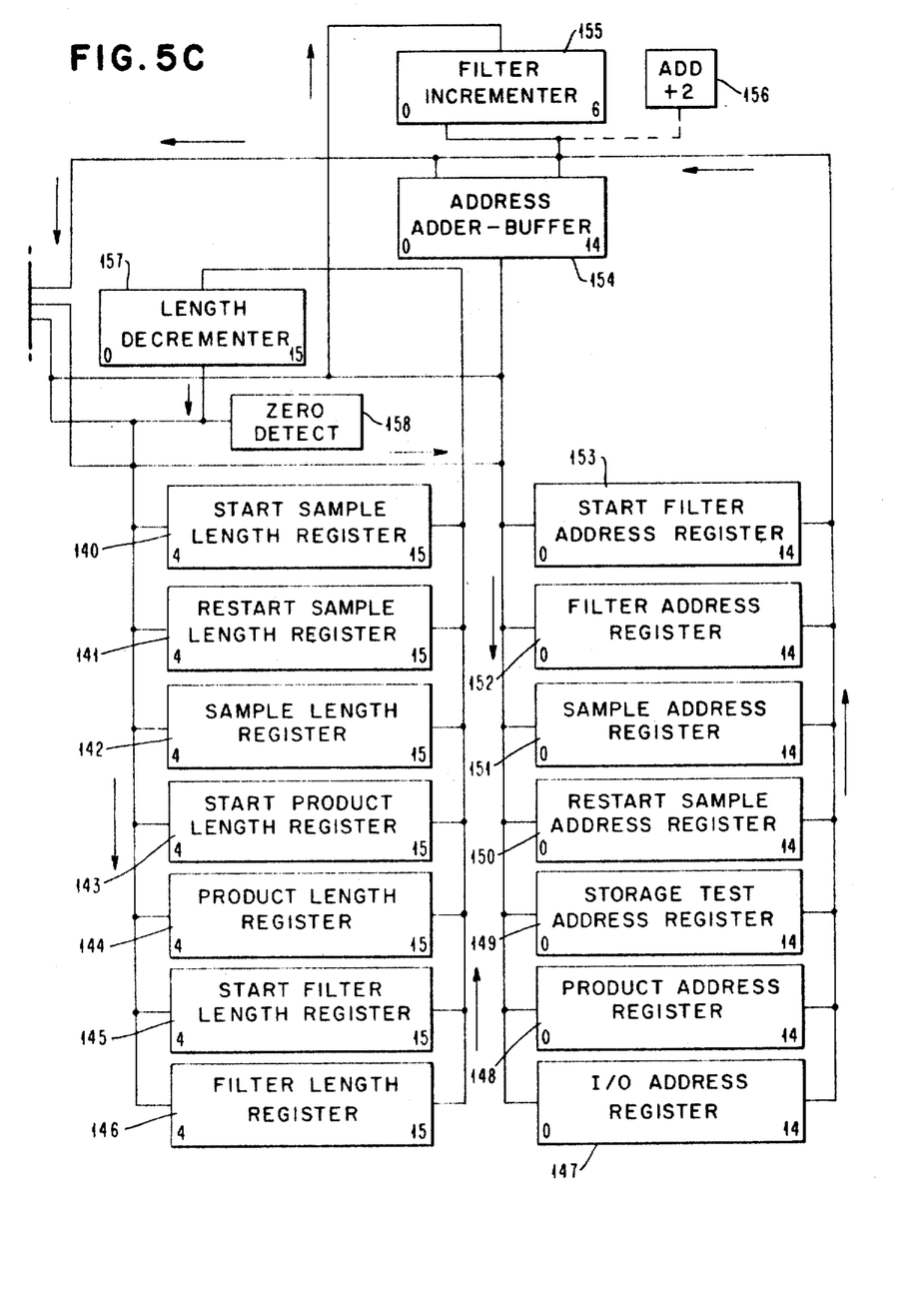

A peripheral processor to compute the above functions is shown in FIGURES 5a, 5b, and 5c wherein FIGURE 5a illustrates the arithmetic unit of the processor, FIGURE 5b illustrates the storage and interface bus unit and FIGURE 5c illustrates the storage control unit.

As shown in FIGURE 5a, the arithmetic unit is designed to generate from one to six sums of products at a time. To this end, the first six sample operands are transferred from the sample field area of storage 136 of FIGURE 5b to the P registers 110 . . . 115 and the first filter operand is transferred to Q1 register 116 to set the latches of Q2 register 117. Each of the filter and sample operands contains 16 data bits plus two parity bits which length will be defined as two bytes or one-half word.

The individual products are formed by operation on the respective individual operands in the P registers 110 . . . 115 and the respective sums of products are formed by adding the individual products as they are formed to previously formed partial sums stored in the six R registers 123 . . . 128. With the provision of the six result storing registers, the processor of the present invention is capable of forming either a single sum of products or six sums of products during one series of operations. When six individual sums are to be formed, the first filter operand is transferred to Q2 register 117 as described above and then the product of this first filter operand with each of the first sample operands from the P registers are sequentially formed and passed through the adder system to the respective R registers which initially contain no partial sums. As each product is formed, the respective sample operand is transferred to the next lowest P register. After this operation has been completed the second filter operand is transferred to the Q2 register 117 and a second series of products is sequentially formed with the modified set of sample operands as required by the functions being computed. Upon the formation of the individual products, they are then added to the contents of the respective R registers with the results being placed back in the corresponding R register and this process is continued until the first six sums have been computed. The contents of the R registers are transferred to the local storage and the second series of six sums is formed in each of the R registers. This series starts with the first filter operand and the seventh sample operand. The computation is repeated until all sums have been computed with each series starting with the first filter operand and a new sample operand the designation of which has been incremented by six over that of the first sample of the previous series.

Multiplicand generator 119 is so called because it forms the individual partial products which are added together in Carry Save Adder 120. Multiplier decoder 118 separates the output of Q2 register 117 into seven 3 bit groups and one 2 bit group. Each group is decoded and the result acts as an individual multiplier on the entire contents of the particular P register, that is the particular sample operand currently being multiplied. The bits in each 3 bit group, when decoded, produce one of four possible submultipliers. The last group of only two bits produces one of two possible submultipliers. Multiplicand generator 119 performs the partial multiplication operation by shifting the contents of the particular P register, that is of the particular sample operand, according to the pattern determined by the group decode signal received from multiplier decode 118. In this manner, each group of multiplier bits produces a 17 bit output which may be in either true or complement form depending upon the respective signs of the particular filter and sample operands.

Carry Save Adder 120 performs the function of generating the individual bit sums as well as the carries for the additive combination of partial products which sums and carries are added together in carry look ahead adder 121. The full sum is in the form of a 32 bit result. Devices for performing the type of multiplication thus described are disclosed, for example, in an article entitled, "High Speed Arithmetic in Binary Computers" by O. L. MacSorley, published January 1961, in The Proceedings of the IRE.

Residue generators 131 and 129 as well as residue check 130 are provided to keep a constant check on the multiplication summation process to stop the operation if an error occurs and to indicate the type of error which caused the operation to stop. The generators produce bits, called residue, which are used to predict the result of the multiplication summation process. If the predicted result does not match the actual result an error condition is generated. The residue generation is based on a modulus 3 system. The odd bits of the input to either generator are assigned a residue value of 1 and the even bits are assigned the value of 2. These bit values are added, eliminating any combination resulting in 3, to produce a residue value for the entire number.

Residue generator 131 generates the particular residue values for each of the filter and sample operands. When a filter and sample are multiplied, the residue values are also to be multiplied and 3's are eliminated to produce a product residue. Residue generator 129 produces the actual residue for the product sum which is compared with the predicted residue in residue check 130. If the actual residue is not equal to the predicted residue, then an error signal is generated.

Before describing the storage and input-output control circuitry, the clock and timing circuits, which are not shown, will be briefly described. The clock is under the control of a matrix busy latch and runs on an as-needed basis. The matrix busy latch is set at the start of the processing and is reset upon completion of the operation. The data handling is controlled by four ring circuits which load, multiply, single multiply (if desired) and store the resulting products.

The load ring consists of seven latches the outputs of which are used to gate out the filter and sample addresses and lengths as will be described below. When the load ring has completed its operation, it starts either the multiply or single multiply ring. The multiply ring consists of six latches the outputs of which are used to operate on the stored data to produce the resultant sums of products. This ring circuit controls the multiplication and summation processes and when this ring has completed its operation it will start again if the conditions which started the multiply ring are still present. The single multiply ring is a four step ring which is used to control the multiplication and summation operation during a single product mode if such is required. The store producing circuit consists of six latches whose outputs are used to store the results of multiplication-summation process upon the completion of that process.

The above described ring circuits also control the selection and updating of seven length registers the contents of which specify the number of data units to be employed in the summation multiplication operation as well as seven address registers the contents of which specify the particular locations in local storage 136 (See FIGURE 5b). These particular registers along with appropriate incrementors and decrementors form the storage accessing control unit illustrated in FIGURE 5c which will now be described so as to more particularly define the manner in which the peripheral processor computes the desired functions.

The respective address registers 147, . . . , 153 are provided with the storage addresses of the sample, filter and product fields as well as other information as described below. Each of these registers is accessed by a common bus and also supplies information to a common bus connected to the storage data register 135 of FIGURE 5b. The four control rings described above, as well as a control command byte, determine which register is to be set with the available information. The filter, sample and product address registers are continuously updated under the control of the control rings as the multiply summation process progresses. Adder-buffer 154 is adapted to add either pulse 2 or the contents of program controlled filter incrementor 155 to update the respective addresses which have been employed to address storage 136. The updated addresses are then sent back to their respective registers.

Start filter address register 153 is provided with the address of the first filter operand to be employed. Each time the load ring is started, the start filter address is gated out to storage address register 137 of FIGURE 5b to load the first filter operand into Q1 register 116 of FIGURE 5a. The start filter address register is loaded from the interface assembler 134 of FIGURE 5b with information contained in a control command to be described below. Filter address register 152 is provided with the address of the next filter to be read out of local storage during a series of multiplications. The start filter address is incremented by the contents of filter incrementer 155 and placed into filter address register 152 during the first cycle of the load control ring. During each cycle of the multiply or single multiply ring, the address of the next filter is gated to storage address register 137 of FIGURE 5b for addressing the next filter operand to be used in the next series of multiplication. Each time a filter address is gated to the storage address register, it is also gated to adder-buffer 154 for incrementation by the contents of filter incrementer 155 and sent back to filter address register 152.

Sample address register 151 contains the address of the next sample to be read out of local storage. Sample address register 151 is set to zero. During the load cycle, the contents of this address register are gated to the storage address register and are also incremented by adder-buffer 154 and placed back in sample address register 151. When the sixth sample address has been read out of the sample address register 151, it is also incremented by two and placed in restart sample address register 150 as well as register 151. After the first six product-sums have been formed, the restart sample address is gated out to the storage address register to address the first sample of the next series of multiplications.

Product address register 148 contains the local storage address where the first product-sum is to be written during a store operation. During the first store operation the first address in the product-sum area of local storage is forced into register 148. Since product-sums are full words, that is 32 bits plus parity, two storage cycles are required for each step of the store operation and the contents of register 148 will be incremented by two after each set of two half words have been stored with the incremented address being placed back into register 148. Before the start of an I/O operation, the address of the first product sum is gated to the I/O address register 147.

I/O address register 147 is employed during operations communicating with the peripheral control unit and under control thereby. Such operations may include the writing of sample and filter operands into the local storage as well as reading the product-sums out of local storage to the control unit. These operations will be further described below. Storage test address register 149 is provided for employment during manual servicing and testing of the peripheral processor.

The contents of each address register is indicative of the local storage location to be accessed at the start of that particular sequence of operations being conducted at the time the particular address register is employed. However, the number of times that a particular address is employed, updated and returned to its register is determined by the length registers associated with that same operation. There are seven length registers illustrated in FIGURE 5c at 140, . . . , 146. The initial lengths are set by a programmer by means of a command and may not be changed except through the issue of a control command. During each data transfer, the length corresponding to that particular data is transferred out of its respective register to length decrementor 157 and restored in its particular register. When a particular length has been decremented to zero, this condition is detected by zero detect circuit 158 in response to which that particular operation is ended.

Start sample length register 140 is supplied by the contents of a channel control command to be described later and contains the number of samples to be used in developing product-sums. The contents of this register are gated out to the decrementer only when processing is started for the first time for that entire operation. Sample length register 142 contains a running total of number of samples left at any particular time. It is first set with the decremented length received from start sample length register 140 by way of length decrementer 157. Thereafter, the contents of sample length register 142 are gated out, decremented by one and replaced in register 142 for each sample read out of local storage 136 (see FIGURE 5b). This process continues until the sample length reaches zero.

In most operations, when the first series of multiplication-summations has been completed, the entire operation is incomplete because there are still samples left to be multiplied. Once the initial product-sums have been stored, the first six samples are no longer needed, therefore, the operation must return to a sample length which is six samples less than the total number of samples, that is, the initial sample length. Restart sample length register 141 is set just prior to the multiplication cycle with the updated contents of the sample length register 142. This number, placed in restart sample length register 141 would then be just six less than the initial start sample length. The entire process may require several store and load cycles but the contents of restart sample length register 141 will always contain the length which is six less than the preceding length.

Start filter length register 145 is also loaded by means of a channel command which specifies the initial number of filters to be used in developing the product-sums. Filter length register 146 is set with the decremented contents of start filter length register 145 during each load cycle. During each of the multiply cylces, one filter is multiplied by six samples as was described above and the next multiply cycle causes the next filter to be multiplied by six samples. Thus the contents of filter length register 146 are gated out to length decrementer 157, decremented by one and replaced back in register 146 during each cycle of the multiply (or single-multiply) cycle.

Start product length register 143 is also loaded by means of a channel command with information indicating the number of desired products in terms of multiples of six. That is, when six product-sums have been developed and are ready to be stored, the contents of start product length register are gated to length decrementer 157, decremented by one and returned to product length register 144 indicating that six product-sums have been formed. After the next set of six product-sums has been formed, the contents of product length register 144 are gated out to length decrementer 157, again decremented by one and placed back in product length register 144. The multiply-summation process has been completed when the product length is decremented to zero.

The remaining circuitry in FIGURE 5b include bus OUT 38 from the peripheral control unit to interface register 133 from which data and control information are transferred to interface assembler 134 where the individual bits are assembled into half words (2 bytes). Data transfer to the peripheral contol unit is also by way of inteface register 133 to bus IN 39 to the peripheral control unit. Sense byte register 138 and status byte register 139 contain information generated by the processor for transfer to the peripheral control unit at such times as required as will be discussed below. Unit address register 132 is provided to receive the processor's unit address during the initial selection of the processor for operation as will also be later described.

In addition to assembling data bits into larger data segments assembler and twos complementer 134 is employed to detect data having a negative sign as indicated by a particular sign bit in that byte and to convert the number to its twos complement so that the multiply summation process may be carried out on both positive and negative numbers. More specifically, the data bytes have significance in groups of two with the sign bit existing in the higher order byte. Circuitry for such detection and conversion will be of a type apparent to those skilled in the art.

The special purpose processor thus described is attached directly to input-output interface 17' of a data processing system including a main storage 10, a central processor 12 and one or more peripheral control units 14, 14'. Such peripheral control units are also referred to in the art as data synchronizers or channels in that they respond to a single instruction initiated by the central processor to retrieve the appropriate control information from main storage to initiate data and control information transfer between main storage and any given peripheral device. In the present invention, such a peripheral device is a special purpose processor such as the one described above.

Before describing the detailed construction and operation of the channel, it is believed in order to describe the format of binary code combinations which serve as instructions, commands and control orders to initiate the operation of the channel in directing the flow of information between I/O devices and main storage. An instruction is decoded by the CPU. The instruction may be a start I/O, halt I/O, test I/O, or a test channel. Commands are fetched from memory by the channel when a start I/O instruction is received. Commands, after decoding initiate I/O operation. The channel is capable of executing write, read, read backwards, control, sense and transfer in channel commands. A control command indicates an operation at an I/O device that may not involve transmission of data, e.g., backspacing or rewinding magnetic tape.

Figure 2:
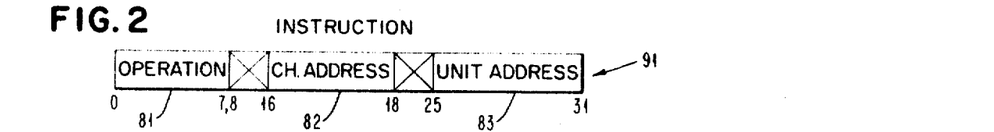
FIGURE 2 is a diagram of a typical instruction to be executed by the central processing unit.

Referring to FIGURE 2, an instruction format 91 is indicated as comprising 32 binary bit positions. The instruction format comprises an operation code field 81, a channel address field 82 and a device or unit address field 83. The operational code is eight binary bits and may describe a start I/O, test I/O, halt I/O, and test channel operation. Bit positions eight through fifteen and eighteen through twenty-five of the instructions are ignored. The channel address field comprises three binary bits and the device address comprises eight binary bits.

Figure 3:
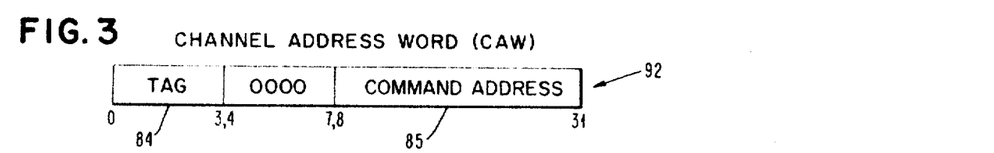
FIGURE 3 is a format of a channel address word.

A start I/O operation directs the channel to enter storage at a designated location and obtain a channel address word (CAW), the format of which is in FIGURE 3.

Essentially, the CAW 92 is an indirect address providing the location of the desired command. The CAW, as indicated in FIGURE 3, has 32 binary bit positions including a tag field 84 and a command address field 85. The tag field 84 has four bits which control the access to the memory area in which I/O operation, i.e., read, write, read backward, etc., will be performed. The command address field 85 specifies the location of a command control word (CCW) which describes the particular I/O operation to be performed. The bit positions four through seven must be binary zeros for CAW validity purposes.

Figure 4:
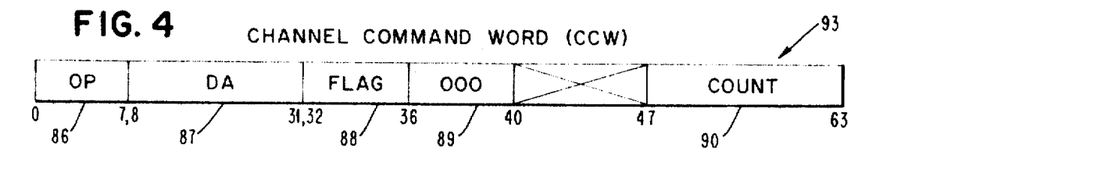
FIGURE 4 is a format of a channel command word.

Referring to FIGURE 4, channel command word (CCW) 93 with a format of 64 bit positions plus eight parity bits (not shown), includes an operation code field 86 of eight bits; a data address field 87 of 24 bits; a flag field 88 of five bits; a buffer field 89 of three bits, and a count field 90 of sixteen bits. The bit positions 40 through 47 are ignored. The command field 86 specifies the operation, i.e., read, write, etc., to be performed. The data address field 87 specifies an eight byte storage location in the main storage where the data is to be stored or read. The count 90 specifies the number of data bytes to be processed. Bit positions 37–39 indicate the validity of the CCW. The flag field 88 comprises a chain data address flag bit, a chain command flag bit, a suppress incorrect length indication flag bit, a skip flag bit, and a program control interruption flag bit.

Specifically, the commands which may be specified by operation code field 86 of the CCW include write, read, control, sense, and transfer in channel.

A write command, appearing in the operation field 86, initiates the execution of write operation at the peripheral device. The command causes data to be transferred from main storage to the peripheral processor. Data in the main storage are fetched in ascending order of addresses starting with the data address specified in the CCW. A CCW used in the write operation is inspected for various flags which indicate error and other conditions encountered in the operation. The write operation may be modified through the appearance of selected bits in the operation field.

A read command initiates the execution of a read operation at the peripheral device. The command causes data to be transferred from the peripheral processor to the main storage. Data are placed in the main storage in ascending order of addresses starting with the address specified in the CCW. All flag bits are inspected during a read operation. The read operation may also be modified by the appearance of selected bits in the operation field.

The control command is used to transfer control information to the peripheral processor in a manner similar to that by which data is transferred under control of a write command. This command is used primarily to update control data that has already been sent to the peripheral processor.

The sense command initiates the execution of a sense operation at the peripheral processor. This command causes sense status information to be transferred from the peripheral processor to main storage. The sense command thus provides for the transfer of detailed information concerning the status of the peripheral processor to the main system.

The instructions, commands, and control orders as presented in the word format, shown in FIGURES 3 and 4, enable the channel to direct the flow of information between peripheral devices and main storage. The instructions are decoded and executed by the CPU and are part of the CPU program. Commands are retrieved by the channel from main storage in response to the instruction. The control orders are part of the commands and are also fetched from main storage. When an instruction, command or order is initiated, the channel performs certain tests before initiation of an operation. In response to an instruction, the channel will send a condition code for the various instructions indicating the status of the channel as operational; not accepted or completed; the channel is actively engaged or that the channel control unit or device is not available to receive the issued instructions. When a channel has accepted an instruction, the address is transmitted to the peripheral device and the return address is delivered to the channel. A proper compare of the sent and received addresses without errors will permit the operation to proceed. In the event a peripheral device is unavailable, a signal is transmitted by the device to the channel which in turn returns a condition code to the CPU indicating that the instruction cannot be performed. The CPU thereupon interrogates the storage to determine the condition preventing the peripheral device from executing the command.

Figure 6:
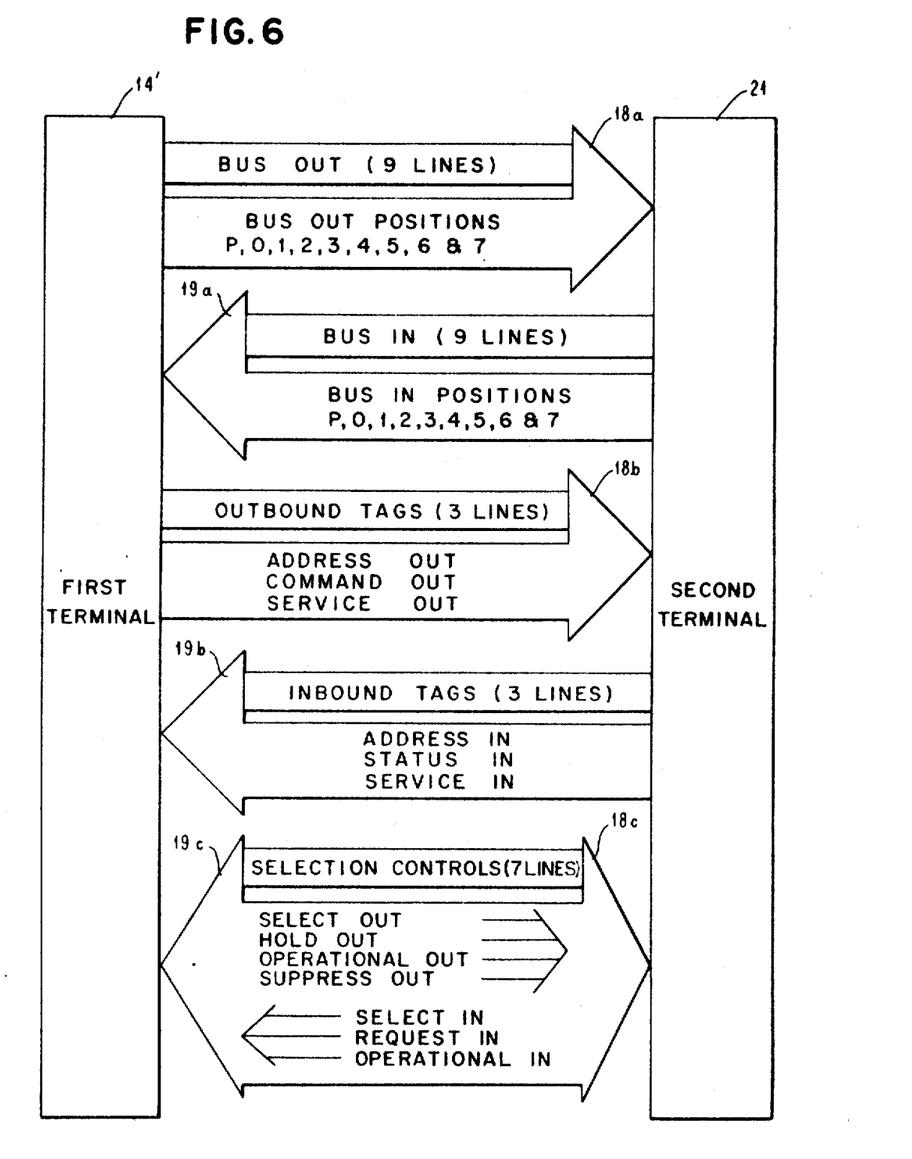
FIGURE 6 is a diagram illustrating a standard interface to be employed between a control unit and one or more peripheral processors.

FIGURE 6 illustrates the various connections of the interface between channel 14 and switching unit 15 as well as between channel 14' and peripheral processor 21. This I/O interface includes bus OUT 18a and bus IN 19a each of which is comprised of 8 data lines and 1 parity line for transfer from or to channel 14 of either data or control information such as device addresses. The interface also includes outbound tags 18b and inbound tags 19b, each of which has three lines which are primarily employed to carry signals indicating the type of information on the bus OUT or bus IN. In addition, the interface includes 7 control lines that are employed primarily in establishing an interlock between the channel and a selected one of the terminals or devices to be connected to the channel.

With such an interlocking interface, the peripheral device or second terminal will respond from time to time to the channel by providing status information on the I/O bus IN 19a while raising the status in inbound tag line. The various conditions to be represented by the status information may include a program interrupt condition represented by an attention bit, a device busy condition, a device end condition and the like. In addition, a particular bit or signal is provided to modify the channel interpretation of any one of the other status information bits.

Figure 7A:
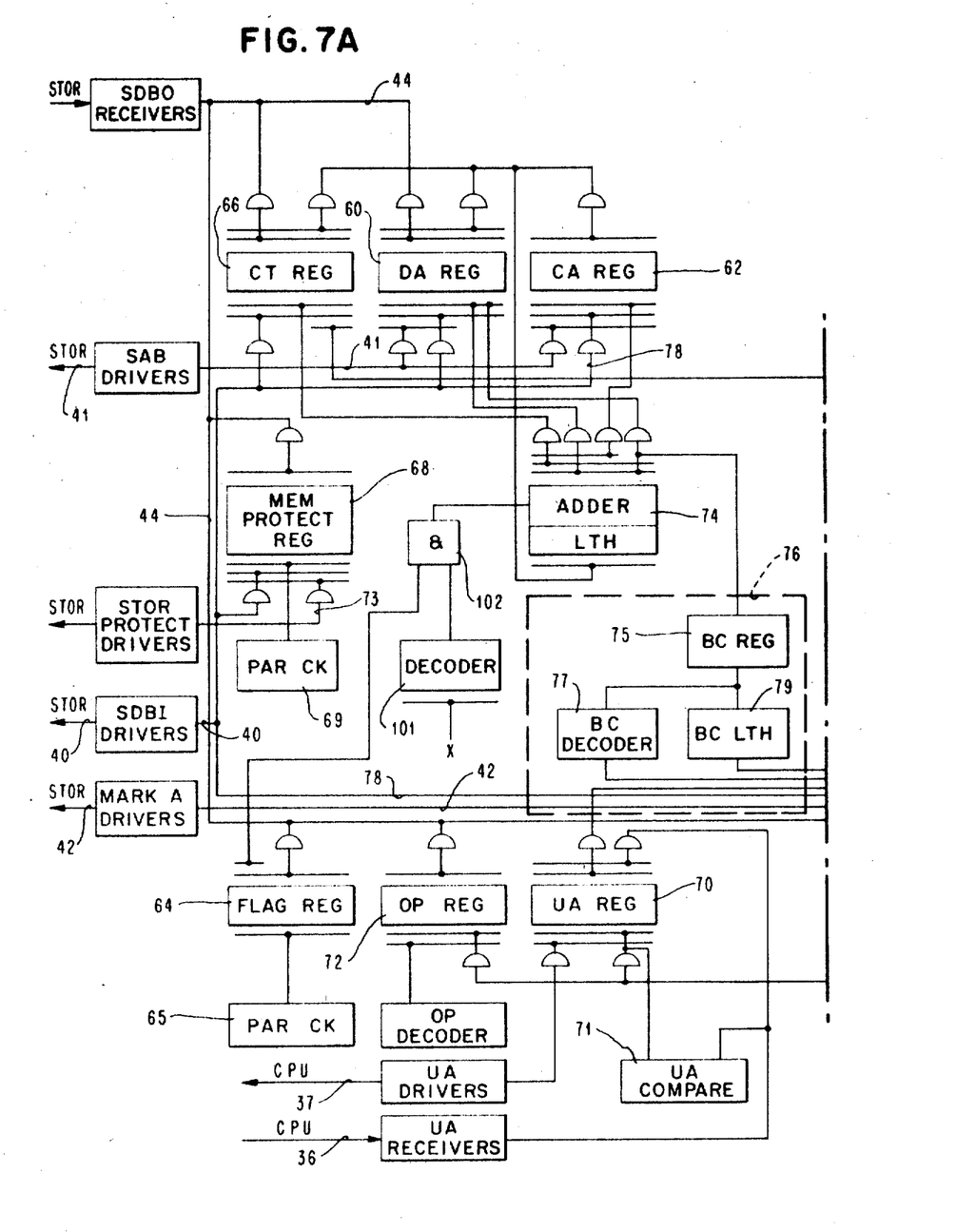
FIGURES 7a and 7b are schematic diagrams of the circuitry of a control unit employed by the present invention.
Figure 7B:
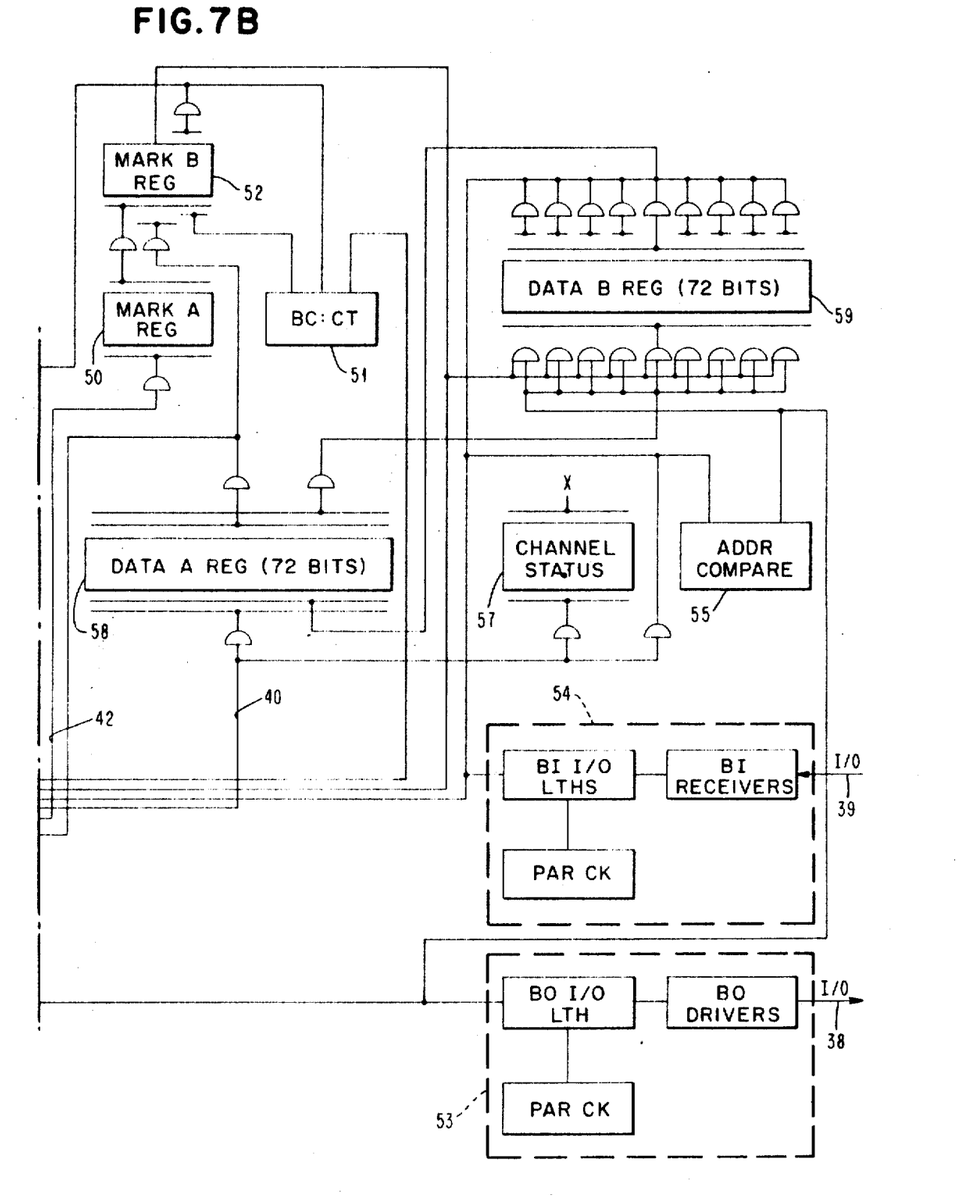

Having described the general features of control operation, it is now believed in order to describe the details and operation of the channel per se. The channel, as shown in FIGURES 7a and 7b, comprises programming registers, data transfer registers, controls and clock means. These units respond to an instruction from the CPU to transfer information to or from main storage. When an I/O device provides any signal that should be brought to the attention of the CPU program, the channel converts the signal to a format compatible to that used by the CPU. The channel contains all the common facilities for the control of I/O operation. The I/O operations are completely overlapped with the activity in the CPU. The only main storage cycles required during I/O operations are those needed to transfer the data to or from the final locations in main storage. These cycles do not interfere with the CPU program, except when both the CPU and the channel concurrently attempt to refer to the same storage. Each of the various sections of the channel will be considered in the following paragraphs.

Referring to FIGURE 7a, a data flow diagram indicates a data address register 60, a command register 62, a flag register 64, a count register 66, a storage protection register 68, a unit address register 70, and an operation register 72. Cooperating with these registers are an adder 74 and a byte counter 76. The registers are connected together through the storage bus IN 40 and OUT 44, storage address bus IN 41, and other data paths. The horizontal lines across the top of a register indicate the number of bit positions receiving a particular input. The horizontal lines across the bottom of a register indicates the number of bit positions providing a particular output. The partial circles in the data paths indicate gating means.

Referring to FIGURE 7a, the data address register 60 is a 24 position register. Additional positions are included for parity checking. Each storage position is a latch circuit which will be descrbed hereinafter. Data entry for the register is from two sources. Each bit position is wired to a preselected line of the storage bus IN 40 and storage but OUT 44. All bit positions except the three low order positions are further wired to a corresponding bit position of the adder 74. The outputs of each bit position are to a corresponding bit position of the adder 74. All bit positions except the three low order positions are further conected to preselected lines of the storage address bus 41. The three low order bit positions of the register are connected as inputs to the byte counter 76 and the corresponding positions of the adder 74.

Basically, the register 60 (21 bits thereof) holds the address where data is to be stored in the storage unit. During a transfer-in-channel command, the register holds the address of the next CCW. This same address is updated and sent to register 62 as the next CAW. The register is updated according to a read, write or a read backward operation. The three low order positions indicate the byte position of a word where storage or transfer is to begin.

The command address register 62 is a 21 position register. Each position consists of a latch of the type indicated in the data register. Three additional positions are included for parity indication. Entry to the command address register is through corresponding bit positions of the adder 64. These inputs are ANDed together with suitable gating, as will appear hereinafter. One output from the command address register is supplied to corresponding adder positions. Another output is supplied to preselected lines of a channel status bus 78 which ultimately connects to the storage data bus IN 40. The other output is to storage address bus 41.

The register 62 holds the CAW which provides the location of the desired CCW. While the CCW is fetched, the CAW is updated to provide the location of the next CCW, if desired. The contents of the register become part of the CSW when an interrup condition is signaled by the channel.

The count register 66 is a 16 bit register. Each position consists of a latch. Additional positions are included for parity checking. The register also includes a last word trigger output, a count less than two, and a count less than one trigger which will be described hereinafter. Entry to the count register is through preselected lines of the storage data bus output 44 and corresponding bit positions of the adder 74. These input are suitably ANDed with gating signals to be described hereinafter.

The outputs available from the count register appear in true and complement form. The three low order bits are supplied to a byte-count-register comparator 51 and mark B register 52 (see FIGURE 7b). All bit positions are supplied to the adder 74 and to the CSW bus 78. Suitable gating circuits operate the count register as will appear hereinafter.

The count register accepts the count field from the CCW supplied from storage. The count field is altered by the adder as data transfer occurs through the channel. Additionally, the count field and low order positions of the byte counter are algebraically related to determine the end of a data transfer operation.

The flag register 64 is a five bit position register. Each position consists of a latch. Entry to the flag register is through selected positions of the storage data bus OUT 40. These inputs are ANDed together with suitable gating signals as will appear hereinafter. The outputs are supplied to parity checking circuits 6:. Other outputs (not shown) are supplied to various control circuits to be described hereinafter.

The flag register holds the five flags described in conjunction with FIGURE 4. The flags, for example, indicate whether chaining is to be performed or a channel error condition exists.

The unit address register 70 is an eight bit position register for receiving the address field of the CPU instruction. The address field selects the I/O device to be operated. Entry to each bit position is supplied by the unit address bus OUT 36 and the data bus IN 39. These input signals are suitably gating to develop output signals which are supplied to corresponding bit positions of a unit address compare register 71. The outputs are also supplied to the unit address bus IN 37, and to the I/O bus OUT 38. Outputs (not shown) are also provided for storage data bus in gating circuit.

The register holds the address which is employed to select an I/O device. Alternatively the register holds the address of a device supplying interrupt status. Parity checking circuits are also included in the register.

The unit address compare register 71 is an eight bit position register for comparing the address on the unit address bus OUT 36 and the I/O bus IN 38. Based on this comparison, a unit address compare signal is supplied to suitable control circuitry for operating the channel.

The storage protection register 68 is a four bit position register. Each position consists of a latch. Entry to the register is through preselected positions of the storage data bus OUT 44. These inputs are ANDed together with suitable gating signals. The outputs from the register are supplied to the storage protect bus 73 and selected bit positions of the channel status bus 78. Additionally, outputs are supplied to a parity checking circuit 69.

The register 68 holds the storage protection tag which controls the area in storage to which the channel has access.

The operations register 72 is an eight position register. Additional positions are included for parity checking. Each position consists of a latch circuit. Entry to the operations register is through the storage data bus OUT 44. These inputs are ANDed together with suitable gating signals. The outputs from the register are supplied to the data out bus 38 of the I/O interface. Additionally, these outputs are also supplied to storage data bus in gating (not shown). One output (not shown) is supplied to the byte counter 76 to indicate a read backward operation.

The register 72 supplies the command code described in conjunction with FIGURE 4 and Table I for operating the I/O devices 15' . . . 16' (see FIGURE 1) in the particular modes, i. e., read, write, sense, and the like. Commands that initiate these operations cause all eight bits to be transmitted to the I/O device. The high order bits contain modifier bits. These bits specify to the I/O device the details of how the command is to be executed. They may cause the I/O device to compare data received during a write operation with data previously recorded and they may specify such conditions as recording density and parity. For the control command, the modifier bits may contain the order code specifying the control function to be performed.

Whenever the channel detects an invalid command, a program checks condition is generated. When the CCW contains an invalid code, the status portion of the CSW is stored during the execution of the start I/O instruction. When the invalid code is detected during command chaining, the new operation is not initiated and an interruption condition is generated. The command code is disregarded during data chaining.

The adder 74 is a 24 position unit including a full adder portion and an increment and decrement portion. The full adder portion involves the four low order bit positions. The remainder of the adder is the increment and decrement portion. All bit positions have latched output controlled by suitable gating circuitry.

Entry from the low order bit positions is from the data register 60. Additional inputs are supplied from the count register 66 which supplies inputs to all adder bit positions. Bit position four receives a carry signal (not shown) from the increment-decrement portion and the data address signal. Outputs are supplied to a parity checking circuit (not shown), the incrementer-decrementer position (not shown) and the count register 66.

Each bit position of the incrementer-decrementer receives inputs from the command address register 62 and the data address register 60. Additionally, these bit positions except the last bit or high order positions receive an input from the count register 66. Outputs are supplied to the data address register 60, command address register 62, and count register 66. An output is also supplied to a parity error checking circuit (not shown). Incrementing or decrementing is determined by an adder group carry and borrow circuits (not shown).

The adder, incrementer-decrementer, parity prediction circuits, group carries and borrow circuits cooperate to update the count field and increment or decrement the data address or command address fields. During the processes the command address registers and count register are vertified from a parity error standpoint. Any parity error is reported to the appropriate controls for initiating the proper diagnostic routine for the channel. The adder decrements the count by eight and increments the data address by eight.

The byte counter 76 is a three position unit for variable word boundary selection of the data transmitted between the I/O device to storage. The counter includes a register 75, a decoder 77, and a latch 79. Each register bit position 78 comprises three like circuits suitably interconnected. Entry to each bit position is supplied by the three low order outputs of the data address register 60. Suitable gating signals (not shown) are provided in developing output signals supplied to the byte counter decoder 77 and latch circuits 79. Outputs are also supplied to a parity and zero check circuit to be described hereinafter.

The byte counter decoder 77 receives the three inputs from the register 75 and provides like outputs to mark B register 52 and the data B register 59 (see FIGURE 7b). The encoder selects the appropriate triggers of the mark B register and data B register for operating the storage address bus in supplying the data stored in the A register 58 to storage. The latch 79 receives the same inputs as the register 75. These outputs are supplied to a byte counter-count register comparator 51 shown in FIGURE 7b. The byte counter is a binary octal counter with a parity bit for self checking purposes. The latch and decoder sections form a look-ahead feature which eliminates ripple time associated with binary trigger counters. When the byte counter receives a change signal, the register 75 is set to the value in the look-ahead feature. The look-ahead value is arranged to be one number higher than that in the register positions. Once the register has changed, there is no delay required to decode the outputs as the look-ahead feature is latched while the counter is changing. The look-ahead circuitry advances immediately to the next number as soon as the change occurs. The counter may be set to any number by the data address input.

Having described the programming registers for the channel, it is believed now in order to describe the data transfer registers for transferring data between storage and the I/O devices. Referring to FIGURE 7b, the data transfer registers include a mark A register 50, a mark B register 52 an A register 58, a B register 59, a byte counter-count register comparator 51, I/O bus IN circuits 54, I/O bus out circuits 53, channel status circuits 57 and an address compare register 55. Each of these registers will be considered in the separate paragraphs hereinafter.

The mark A register 50 is an eight position register that includes an additional position for a parity error check. Each bit position is a conventional latch circuit. Entry to the mark A register is from corresponding bit position of the mark B register. These inputs are ANDed together with suitable gating signals.

The mark A register also receives as gating inputs channel memory controls and other signals. These control signals cooperate with the bit position inputs to provide outputs to the mark bus 73 of the storage. Outputs provided by the various bit positions of the mark A register set the storage triggers for storing data at selected storage locations.

The mark B register 52 is an eight bit position register. Each bit position is a conventional latch circuit. Entry to the mark B register is supplied by the output of the byte counter decoder 77. The count register 66 also supplies its four low order bits to corresponding positions of the mark B register. These signals are ANDed together with suitable write control signals and a gating signal. The register also includes means for parity error checking. All bit positions are supplied to the corresponding bit positions of the mark A register. The three low order bit positions are supplied to the byte count register comparator 51 for word boundary determination. The three low order bits are also supplied to the storage data bus OUT 44. The mark B register sets the mark A register based upon received inputs.

The A register is a 64 bit register for transferring data or assembling data between the storage 10 and the I/O devices 15', 16' and the like (see FIGURE 1). Each bit position is a conventional AND/OR/INVERT cooperating with a conventional inverter to form a latch circuit. Entry to each bit position is from preselected lines of the storage data bus OUT 44. Also, the corresponding bit positions of the B register 59 are connected to the A register bit positions. These inputs are ANDed together with suitable storage data bus gating signals. As outputs, each bit position is connected to corresponding bit positions of the B register and to preselected lines of the storage data bus IN 40. A parity bit is generated for each byte and supplied to the B register and the storage data bus IN.

The B register 59 is like the A register, a 64 bit register. Each bit position has the same circuit configuration. Entry to each bit position is from the corresponding bit position of the A register. Each bit position is further connected to the I/O bus IN 39. These inputs are ANDed together with A register gating signals and I/O gating signals. The I/O gating signals direct various bytes of incoming data to the various byte positions. The number or bit positions in a group is selected as eight to handle the byte of information coming from the I/O device. Each group of bytes includes parity error checking means.

The output from each bit position is supplied to corresponding bit position of the A register as previously indicated. Outputs are also provided to preselected lines of the I/O data bus OUT 38. Thus, the B register is adapted to transfer data into storage and out of the I/O devices.

The comparator 51 is a six position unit for receiving true and complement signals from the byte counter latch 79 and the count register 62 (see FIGURE 7a). The true and complement signals from different registers are ANDed together to provide an output to suitable control circuitry. The comparator also receives as an input the three low order bits of the mark B register 52. These inputs are ANDed together with the byte counter latch 79 outputs to provide an output indicating that the byte counter equals the mark B register. This output is also supplied to suitable control circuitry to be described hereinafter.

During data transfer, the comparator 51 compares the inputs of the count register 66 and the byte counter 76 (see FIGURE 7a) to determine the termination of data transfer. The details of this operation will be provided in conjunction with a description of the channel operation.

The bus IN receiver and latch circuit 54 is an eight position unit with an additional position for parity indication. Each position is a conventional latch circuit. Each position is connected to a particular line of the I/O bus IN 39. Outputs are supplied to preselected lines of the B register. Other outputs are supplied to preselected bit positions of the unit address register 70 (see FIGURE 7a). Additionally, outputs are supplied to the channel status circuit 57 to be described hereinafter. The unit 54 is operated by suitable gating signals supplied by control circuits.

The bus OUT receiver and latch circuit 53 is arranged in a configuration substantially the same as that described for the unit 54. The unit has eight positions plus an additional position for parity. Each position is a conventional latch circuit. Preselected positions are the B register 59 connected to selected unit positions 53. Additionally, the operation register 72 and the unit address register 70 are connected to selected unit positions 53. Outputs are supplied to the I/O bus OUT 38. Outputs on the line are determined by the tag lines 18b described in connection with FIGURE 6. Outputs appear on the line according to gating signals supplied from suitable control circuitry.

The address compare register 55 is an eight position register and includes an additional position for parity check. Each position is a conventional AND/OR/INVERT circuit. Each position is connected to the I/O bus OUT 38 and to the input circuitry for the unit address register 70 (see FIGURE 7a). An output signal is supplied to suitable control circuitry (not shown) in connection with the initial setup of the channel when responding to an instruction.

The channel status circuits 57 comprise a plurality of latch circuits responsive to various inputs for indicating the various conditions of the I/O status. Among the various channel status circuits are a wrong length record, a command address update, a program check, a memory protection, a data channel check, a channel control check, and a chaining check. Each latch circuit receives various flag, trigger, control, and gating signals to develop the desired status in signal. The output from the various latch circuits are supplied to the channel status bus 78 for transmission to a storage unit over the storage bus IN 40. Outputs (not shown) are supplied to other control circuits.

With the invention as thus described, a number of particular functions can be performed by one or more special purpose peripheral processors which are attached to a data channel or peripheral control unit of the data processing system by way of the standard I/O interface. Initiation of the operation of the particular peripheral processor is in response to the execution of a start I/O instruction by the central processor in response to which the channel or peripheral control unit retrieves the necessary data and control information from main storage.

The peripheral processor has a preset control unit address and can be attached to any channel. Initial selection begins when the channel places the address of that particular unit on the I/O bus OUT and raises the address out tag line. Then the channel raises the select out and hold out control lines. When the unit has recognized its address on the bus OUT, it places its address on the bus IN and raises the operational in and address in control and tag lines respectively. The channel then responds with the command out signal and places the control information on the bus OUT. The fall of the command out line signals a request for unit status. The processor then replies with the status in signal and places its status on the bus IN. If the status is acceptable, the peripheral processor then proceeds with data service after the channel has accepted the status and replies with the service out signal to complete the interlock across the I/O interface.

To initiate operation of the peripheral processor, the central processor decodes a start I/O instruction, such as described above, in response to which the channel or control unit accesses main storage to retrieve the first channel command word. This command word is a control command and specifies the location in main storage of the filter length and filter field start addresses that are then transferred to the peripheral processor. This control command also contains a chaining bit which causes the channel to then retrieve a second control command which specifies the location in main storage containing the sample length and product length information which is then transferred to the peripheral processor. This second control command also contains a chaining bit which causes the channel to retrieve a third command word from main storage which is the write command and specifies the location in main storage of the sample and filter data required by the peripheral processor. This third command will also contain a bit in its operation code that signals the processor to start is computation upon completion of data transfer thereto. The peripheral control unit is now free to service other peripheral processors or other peripheral devices attached to the I/O interface. If the peripheral processor has already been provided with appropriate control information from a previous operation, then the start I/O instruction decoded by the central processor need only reference the write command.

Once the peripheral processor has completed its operation and the respective product-sums have been stored in its local storage, these product-sums may be transferred back to main storage of the system by the execution of another start I/O instruction by the central processor in response to which a channel command word is retrieved from main storage by the channel where the operation code of the channel command word is now a read command. The establishing of the interlock across the I/O interface and the data transfer are similar to that of the write operation described above.

While the present invention has been particularly shown and described with reference to a preferred embodiment thereof, it will be understood by those skilled in the art that various changes in form and details may be made therein without departing from the spirit and scope of the invention as claimed.

What is claimed is:

1. In a data processing system including a main storage and a central processor adapted to decode instructions, the combination comprising:
   a peripheral processor adapted to perform arithmetic operations on filter data and sample data transferred thereto;
   a channel control unit coupled to said storage, said central processor and said peripheral processor;
   means in said channel responsive to a start I/O instruction to retrieve a first control command from said main storage which command specifies the filter field start address of data to be processed by said peripheral processor and for transferring said address to said peripheral processor;
   means responsive to means in said first control command for causing said channel to retrieve from said main storage a second control command which specifies the sample field address in said main storage and for transferring said address to said peripheral processor;
   means responsive to means in said second control command for causing said channel to retrieve a third control command which specifies a write command and specifies the location addresses in main storage of sample and filter data and for transferring said data to said peripheral processor;
   means responsive to means in said third control command to cause said peripheral processor to start arithmetic operations upon completion of data transfer thereto;
   and means in said peripheral processor for signalling said channel when its arithmetic operations are complete.

2. The combination according to claim 1 wherein said peripheral processor includes a local store for storing filter data and sample data at locations therein, the local store starting location of said filter data specified by said filter field start address of said first control command, the local store starting address of said sample data specified by said sample field start address of said second control command, and means for storing the results of said arithmetic operations in said local store at addresses specified by a product address register.

3. The combination according to claim 2 including means for incrementing by one said filter field address, said sample field address, and said product address register upon completion of each arithmetic operation.

4. The combination according to claim 1 including means in said central processor responsive to said channel signalling means for issuing a start I/O instruction specifying a read command to thereby read results of said arithmetic operations from said local store to said main storage.

5. In a data processing system including a main storage and a central processor adapted to decode an instruction, and having a control unit coupled to said storage and said central processor responsive to the decoding of an instruction by said central processor to retrieve control information from said storage, said control information including an operation code and a main storage address, said control unit being adapted to access said address to retrieve data information, a peripheral processor coupled to said control unit for reception of said data information and responsive to said operation code to perform an arithmetic computation upon said data information, comprising:
   a local storage in said peripheral processor for storing a plurality of filter factors and sample data transferred thereto from said main storage by said control unit;
   first means in said peripheral processor for registering a filter factor of a series of such factors;
   a plurality of means for registering a series of individual sample data;
   and means coupled to said first means and to said plurality of registering means for forming the product of said registered filter factor and each of said individual sample data by serially multiplying the contents of said first means with the contents of each of said plurality of means for registering and storing each successive result in successive result registers.

6. A peripheral processor for forming product sums comprising:

means for transferring a first filter operand to a first register;

means for transferring a series of sample operands to a plurality of second registers;

means for forming a plurality of results of the product of said first filter operand with each of the sample operands sequentially;

means for adding said results to the contents of a plurality of result registers;

and means operable as each product is formed for transferring the respective sample operand to the next lower register in said plurality of registers.

References Cited

UNITED STATES PATENTS

| | | | |
|---|---|---|---|
| 3,247,488 | 4/1966 | Welsh et al. | 340—172.5 |
| 3,297,996 | 1/1967 | Grady | 340—172.5 |
| 3,312,953 | 4/1967 | Wang et al. | 340—172.5 |
| 3,311,739 | 3/1967 | Aiken et al. | 235—164 |
| 3,366,780 | 1/1968 | Lee et al. | 235—164 |

RAULFE B. ZACHE, Primary Examiner

U.S. Cl. X.R.

235—156, 164